United States Patent [19]
Smith, Jr.

[11] Patent Number: 6,052,574
[45] Date of Patent: Apr. 18, 2000

[54] AUXILIARY MONITORING OF EMERGENCY ACCESS CALLS

[75] Inventor: Harold R. Smith, Jr., Oakbrook Terrace, Ill.

[73] Assignee: Lucent Technologies Inc., Murray Hill, N.J.

[21] Appl. No.: 09/102,177

[22] Filed: Jun. 22, 1998

[51] Int. Cl.$^7$ .................................................. H04Q 7/20
[52] U.S. Cl. ........................ 455/404; 455/456; 455/521; 455/416
[58] Field of Search .................................. 455/404, 456, 455/457, 521, 100, 433, 416, 560, 445; 340/825.45, 825.49; 379/45

[56] References Cited

U.S. PATENT DOCUMENTS

| | | | |
|---|---|---|---|
| 5,347,568 | 9/1994 | Moody et al. | 379/45 |
| 5,596,625 | 1/1997 | Leblanc | 379/60 |
| 5,705,980 | 1/1998 | Shapiro | 455/521 |
| 5,740,532 | 4/1998 | Fernandez et al. | 455/404 |
| 5,797,093 | 8/1998 | Houde | 455/404 |

*Primary Examiner*—Daniel S. Hunter
*Assistant Examiner*—Yemane Woldetatios

[57] ABSTRACT

The system for auxiliary monitoring of emergency access calls functions to identify the geographical location of the origination point of the emergency access call and interconnects the appropriate emergency response agency that serves this geographic location to the emergency access call. The emergency access system is programmed to divide the covered region into a plurality of cells, with each cell defining a serving emergency agency and/or serving auxiliary emergency agency. Upon receipt of an incoming emergency call from a telephone station, the switching system determines the location from which the emergency access call originated, and which cell(s) define the serving emergency agency for this location. The system directs the incoming call to the designated emergency service agency as well as any serving auxiliary emergency agency that would be involved in the emergency response to the incoming emergency call. The identified serving auxiliary emergency agency would then be alerted in one of a number of possible ways: simple alert alarm without further data, listen-only bridging on to the incoming emergency call, two-way voice connection on incoming emergency call. The selected mode of alert enables the serving auxiliary emergency agency to either prepare to enable access to the appropriate emergency response agencies and/or actively participate in the response.

19 Claims, 3 Drawing Sheets

AUXILIARY MONITORING OF EMERGENCY ACCESS CALLS

FIELD OF THE INVENTION

This invention pertains to telephone communication systems and, in particular, to a system for processing emergency access calls that are originated from a subscriber telephone station to direct the call to the appropriate emergency response agency that serves the subscriber telephone station's location and to include any auxiliary emergency response agencies that have jurisdiction or control of the location.

PROBLEM

The problem with existing emergency access systems (911 systems) is that, in the instance where the emergency response agency that serves a particular location or region is not the emergency response agency that is connected to the existing emergency access system, the emergency access call data must be manually forwarded by the emergency access operator to another emergency response agency. This sequential access process adds a significant delay to the provision of a response to the emergency call, therefore rendering the response unsatisfactory in nature.

A more common problem is that there are numerous instances where an auxiliary agency controls access to the subscriber location and should be aware of the emergency call so their efforts can be coordinated with the efforts of the emergency response agency. Examples of such situations are: campus security forces, military police, private security in an office building or gated community, park police, private security forces in private entertainment facilities. Furthermore, a plurality of police agencies are typically active in a location, such as state police patrolling limited access US highways which highways are located within a municipality that is patrolled by a local municipal police force. The coordination of efforts between the two police agencies is presently difficult to achieve in such an instance.

The problem is exacerbated when the emergency access call is originated from a cellular mobile subscriber station. The physical location of a standard telephone station is defined by the physical plant that connects the telephone station to the Public Telephone Switched Network (PTSN) and this location is identified by a lookup table that notes the correspondence between a response address at which the telephone station is located and the Automatic Number Identification (ANI) data that is generated with each call origination. A cellular mobile subscriber station has a variable location and when an emergency access call is originated from a cellular mobile subscriber station, it is a non-trivial task to automatically identify the emergency response agency that is appropriate to respond to the emergency.

Thus, the precise interconnection of an emergency access call from a subscriber who originates the emergency call with the appropriate emergency response agency is a difficult task due to the lack of correspondence between the service area boundaries of the emergency agencies and telephone service boundaries, as well as the common occurrence of overlapping service area boundaries for emergency response agencies. These problems result in the operators who man the emergency response agencies having to manually perform the correspondence between subscriber location and the required emergency response agency and/or having to originate another call to an auxiliary agency that should participate in the emergency response, at a time when only limited data is available and time is of the essence. The existing emergency access systems are therefore limited in their effectiveness.

SOLUTION

The above described problems are solved and a technical advance achieved by the present system for auxiliary monitoring of emergency access calls (also termed "auxiliary monitoring system" herein) that functions to identify the location of the origination point of the emergency access call and interconnect the appropriate emergency response agency that serves this location to the emergency access call, including the appropriate auxiliary agencies. The auxiliary monitoring system is programmed to divide the covered region into a plurality of cells, with each cell defining a serving emergency response agency and serving auxiliary agency. The cells can overlap in their coverage areas since the emergency response agencies may have dual jurisdiction for a particular region, such as police and ambulance. Upon receipt of an incoming emergency call from a telephone station, the switching system determines the location from which the emergency access call originated, and the auxiliary monitoring system determines which cell(s) define the serving emergency agency for this location. The auxiliary monitoring system further parses the information associated with the incoming emergency call to identify any auxiliary agency that should be involved in the emergency response to the incoming emergency call. The identified auxiliary agency is alerted in one of a number of possible ways: simple alert alarm without further data, listen-only bridging on to the incoming emergency call, two-way voice connection on incoming emergency call. The selected mode of alert enables the serving auxiliary agency to either provide timely access to the appropriate emergency response agencies and/or actively participate in the response.

The use of this auxiliary monitoring system in serving cellular calls requires the determination of the locus of the call originating party by means of a cell/sector definition by the cellular communication system or other more precise mobile subscriber station location determination apparatus. Once this call origination location data is available, the correspondence between the determined locus and the appropriate emergency response agency and auxiliary agency that may serve this locus is accomplished as described above. As an alternative implementation, the origination of an emergency access call from a closed or well defined site, such as an office building, can be processed by the local customer premise equipment that serves that site, such as in the case where the auxiliary agency, such as a private security agency, serves the site. This capability distributes the call processing responsibility and enables local integration of the auxiliary agency with the emergency response agency. The more general case noted above of the auxiliary monitoring system determining which cell(s) define the serving emergency agency for this location is described herein to illustrate to operation of this system.

BRIEF DESCRIPTION OF THE DRAWING

FIG. 1 illustrates in block diagram form the overall architecture of the present system for the auxiliary monitoring of emergency access calls while FIG. 1A illustrates the format and typical content of the data structures used therein;

DETAILED DESCRIPTION

In the provision of emergency services, emergency access systems (911 systems) are used to automatically connect a subscriber with an emergency access operator who can determine the nature of the emergency and dispatch the required emergency personnel to assist the subscriber. In these systems, the Automatic Number Identification (ANI) data that is generated with each call origination is used to identify the location of the subscriber. This location data and the nature of the emergency, as determined by the emergency access operator, are used to notify the appropriate emergency response agency via a direct communication connection from the emergency access system to the selected emergency response agency. However, there are numerous instances where an auxiliary agency controls access to the subscriber location and should be aware of the emergency call so their efforts can be coordinated with the efforts of the emergency response agency. Examples of such situations are: campus security forces, military police, private security in an office building or gated community, park police, private security forces in private entertainment facilities. Furthermore, a plurality of police agencies are typically active in a location, such as state police patrolling limited access US highways which highways are located within a municipality that is patrolled by a local municipal police force. The coordination of efforts between the two police agencies is presently difficult to achieve in such an instance.

EXISTING EMERGENCY ACCESS SERVICES

Figure 3:
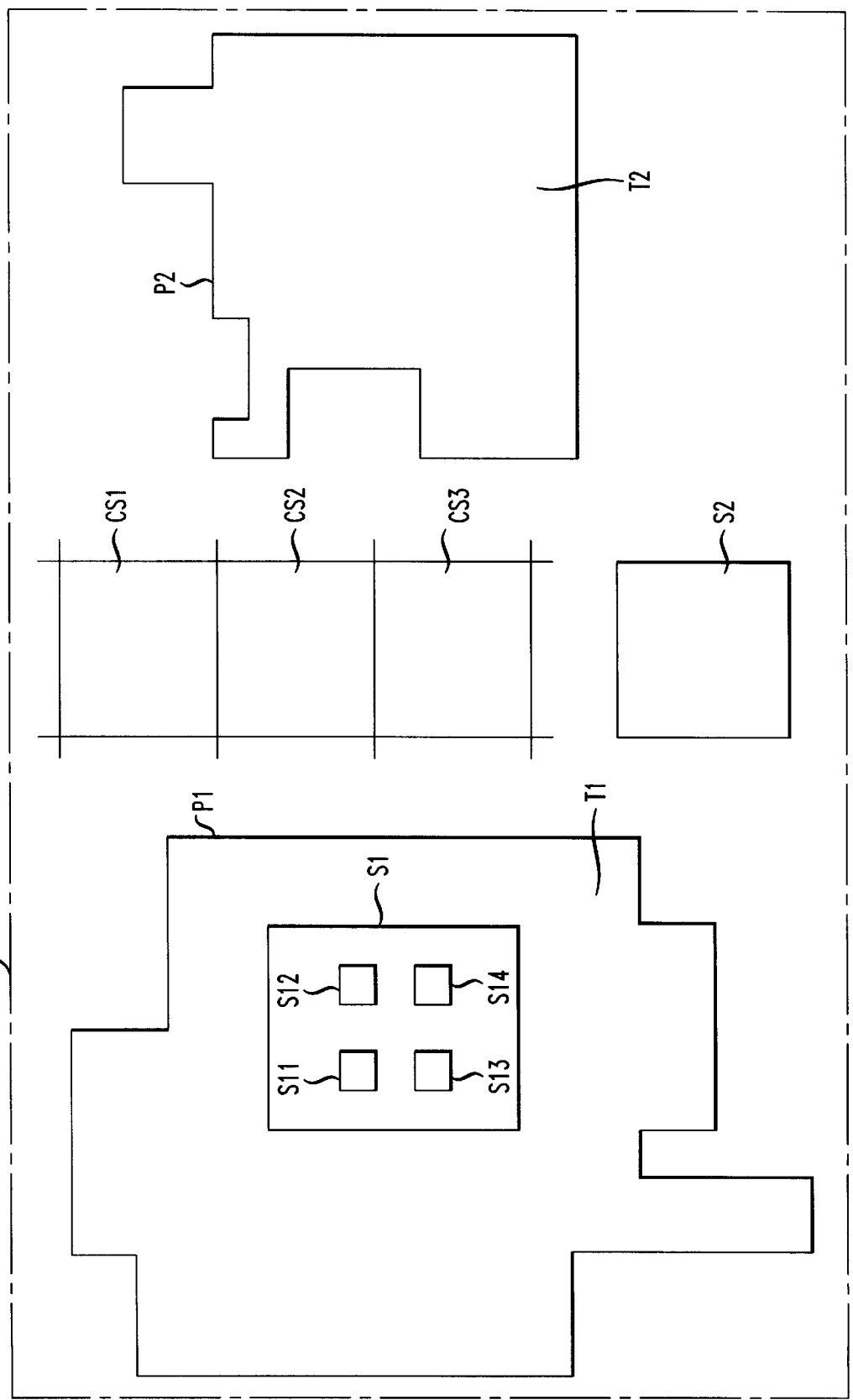
FIG. 3 illustrates an example of the partition of a typical service area using the capabilities of the present system for the auxiliary monitoring of emergency access calls.

FIG. 3 illustrates an example of the partition of a typical emergency access system service area using the capabilities of the auxiliary monitoring system. The region 300 illustrated in FIG. 3 is served in the present example by a telephone switching system 101 (shown in FIG. 1) that serves to interconnect a plurality of subscribers who are equipped with standard wire based telephone stations TSS1–TSSm. In addition, a cellular communication system 102 serves mobile subscriber stations in the same region and is connected to the telephone switching system 101 via a plurality of trunk circuits T1–Tn to enable call connections between the subscribers who are served by the telephone switching system 101 and the mobile subscriber stations served by the cellular communication system 102.

Included in the telephone switching system 101 is an Emergency Access System (EAS) 111 that functions to automatically route an emergency call originated by a one of the plurality of subscribers to the appropriate one of a plurality of emergency service agencies that are operational in the region. Each of the emergency service agencies is equipped with communication systems ES1–ESk that are manned by emergency operators and that enable the emergency operators to communicate with a calling subscriber as well as with the emergency personnel who respond to the emergency call from the subscriber. The emergency access system 111 performs the call routing function based upon the physical location of the calling subscriber, as determined by the physical plant that interconnects the calling subscriber to the telephone switching system 101.

SYSTEM FOR THE AUXILIARY MONITORING OF EMERGENCY ACCESS CALLS

Figure 1:
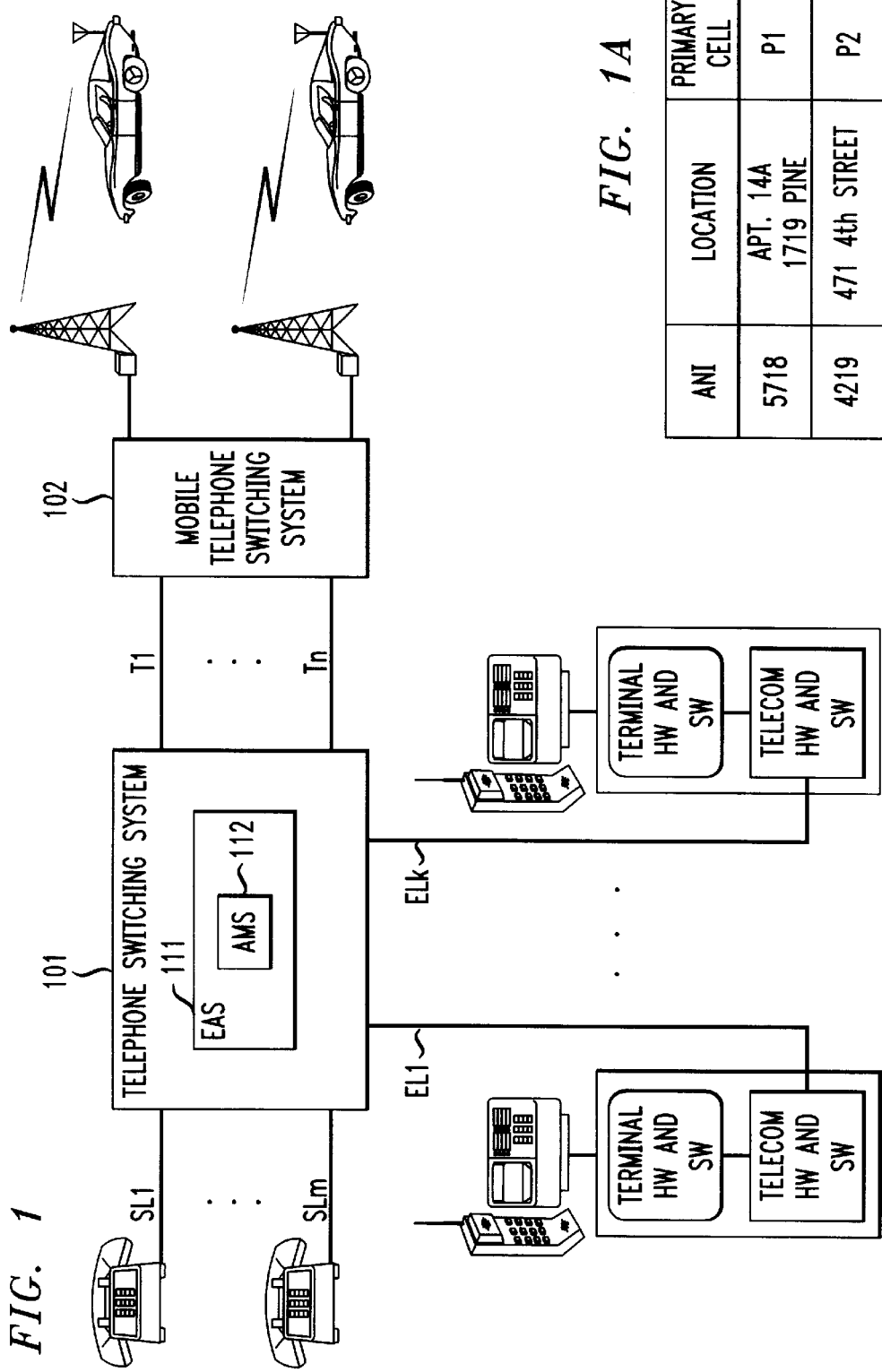
Figure 2:
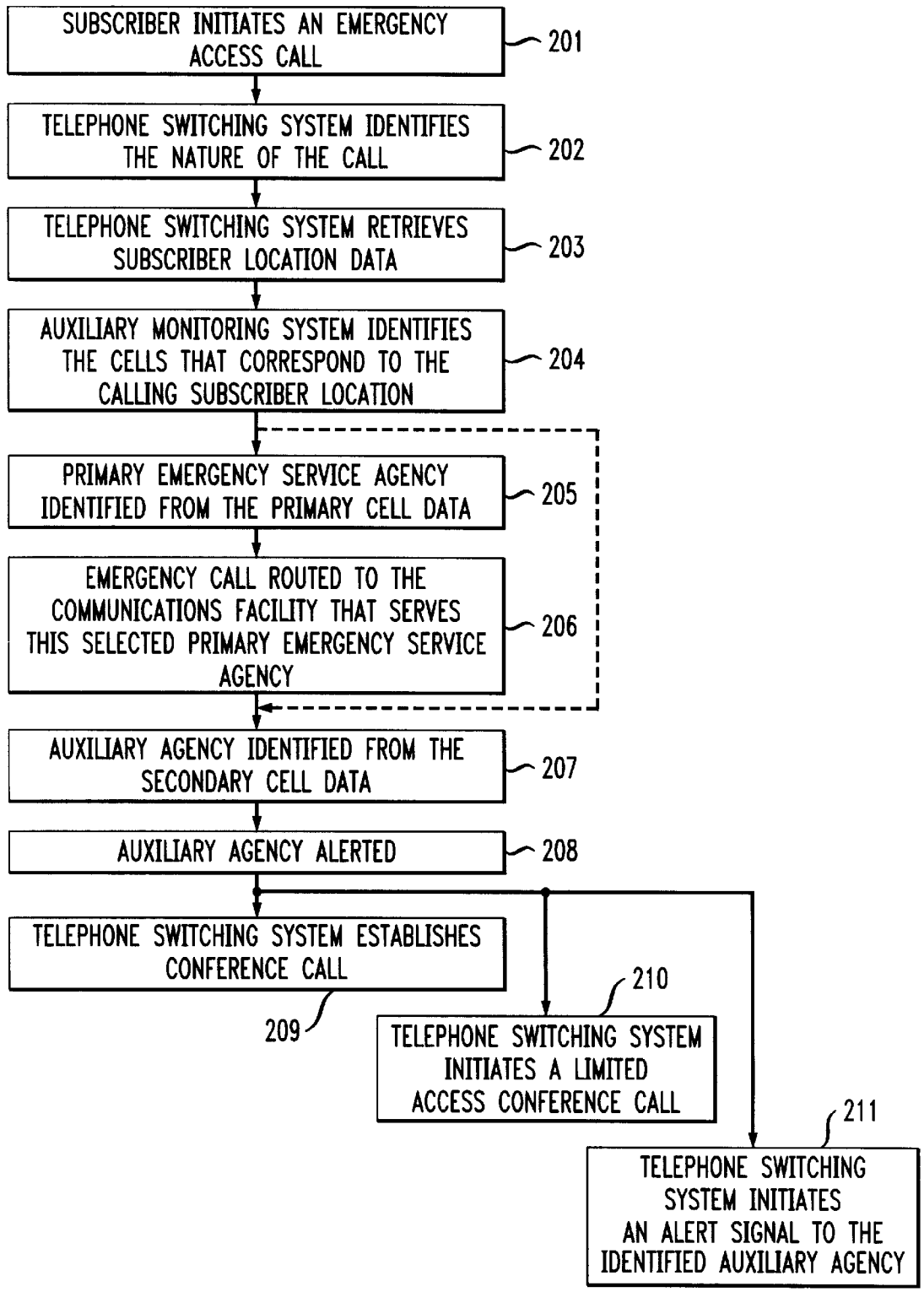
FIG. 2 illustrates in flow diagram form the operation of the present system for the auxiliary monitoring of emergency access calls.

FIG. 1 illustrates in block diagram form the overall architecture and FIG. 2 illustrates in flow diagram form the operation of the present Auxiliary Monitoring System (AMS) 112. This auxiliary monitoring system 112 is operational in the existing emergency access system (911 systems) 111 and is typically either integrated with the existing control software or represents an adjunct process that supplements the operation of the existing software. In either case, the auxiliary monitoring system 112 automatically integrates the connection of the appropriate emergency service agency with the calling subscriber as well as the connection of any auxiliary agency that should participate in the response to the received emergency call.

The emergency call processing begins when a subscriber at telephone station TSS1 initiates an emergency access call to the emergency access system 111 at step 201. The telephone switching system 101 that serves the subscriber's telephone station TSS1 identifies the nature of the call from the dialed digits at step 202 and must then determine the location of the subscriber telephone station TSS1 to route this call to the appropriate emergency service agency. At step 203, the telephone switching system 101 retrieves the Automatic Number Identification (ANI) data that is generated with each call origination. In the case where the calling subscriber is using a mobile subscriber station, the telephone switching system 101 retrieves location data from the cellular communication system 102. In many cellular communication systems, the location of the mobile subscriber station can be ascertained only to the level of a particular cell site or sector. However, more advanced cellular communications systems (TDMA and CDMA) time stamp the calls and are able to more precisely locate the mobile subscriber station within the particular region served by the cellular communication system. In either case, the cellular communication system provides calling subscriber information to the telephone switching system 101 to enable the emergency access system 111 to automatically route this call to the appropriate emergency service agency.

The auxiliary monitoring system 112 at step 204 uses the calling subscriber location data to access the data structures (shown in FIG. 1A) that are stored in memory of the auxiliary monitoring system 112 to identify the cells that correspond to the calling subscriber location. The partitioning of the service area into cells and their management are described below. The auxiliary monitoring system 112 at step 205 identifies the primary emergency service agency from the primary cell data and the telephone switching system 101 at step 206 routes the subscriber emergency call to the communications facility EF1 that serves this selected primary emergency service agency. Either concurrently with steps 205 and 206 that establish this call connection, or immediately after establishing this call connection, at step 207, auxiliary monitoring system 112 identifies the auxiliary agency from the secondary cell data that has jurisdiction or control over the calling subscriber location and at step 208 the telephone switching system 101 alerts the auxiliary agency that an emergency call has been received via the access line ELk that connects the auxiliary agency's communication facilities EFk to telephone switching system 101. This alert can be in the form of one of the steps 209–211, as a function of the nature of the auxiliary agency.

For example, at step 209, the telephone switching system 101 initiates a call connection to the communications facility EFk that serves the identified auxiliary agency and bridges this call connection in a three-way call to the subscriber emergency call that is presently being processed by the communications facility EF1 that serves this selected primary emergency service agency. The operator at the selected primary emergency service agency, with the on-line assistance of the operator at the identified auxiliary agency, can obtain information from the calling subscriber and coordinate the emergency personnel response. For example, if the emergency call is for a medical assist for a resident in an apartment building that has a locked entry, the operator at the identified auxiliary agency can alert staff to be available to admit the ambulance crew to the building, and can provide location specific information to the operator at the selected primary emergency service agency to expedite the emergency response. Since emergency access calls remain active in the telephone switching system 101, even if the calling subscriber hangs up at the telephone station, the operator at the selected primary emergency service agency and the operator at the identified auxiliary agency remain in communication on the three-way call, until they elect to terminate the call connection.

Alternatively, at step 210, the telephone switching system 101 initiates a call connection to the communications facility EFk that serves the identified auxiliary agency and bridges this call connection in a listen only mode on a three-way call to the subscriber emergency call that is presently being processed by the communications facility EF1 that serves this selected primary emergency service agency. The operator at the selected primary emergency service agency can obtain information from the calling subscriber and coordinate the emergency personnel response, with the operator at the identified auxiliary agency being made aware of the nature of the emergency without being able to intervene in the communications between the calling subscriber and the operator at the selected primary emergency service agency. The operator at the selected primary emergency service agency may optionally have control of the communication state of the call and can release the listen-only mode so the operator at the identified auxiliary agency can communicate in the call connection, where appropriate. As with the above example, the operator at the identified auxiliary agency can facilitate the emergency response without impeding its progress, such as in the case where the operator at the identified auxiliary agency is not a trained professional and may by their good intentions inadvertently interfere with the processing of the incoming emergency call but must be able to communicate in a limited mode with the operator at the selected primary emergency service agency once the initial data collection is accomplished.

Finally, at step 211, the telephone switching system 101 initiates an alert signal to the communications facility EFk that serves the identified auxiliary agency to alert an operator at the identified auxiliary agency of the existence of the subscriber emergency call that is presently being processed by the communications facility EF1 that serves this selected primary emergency service agency. The alert comprises a visual and/or audible signal that may include a predefined text message that characterizes the nature of the emergency request. As with the above example, the operator at the identified auxiliary agency can facilitate the emergency response without impeding its progress.

As an alternative implementation, the origination of an emergency access call from a closed or well defined site, such as an office building, can be processed by the local customer premise equipment that serves that site, such as in the case where the auxiliary agency, such as a private security agency, serves the site. This capability distributes the call processing responsibility and enables local integration of the auxiliary agency with the emergency response agency.

PARTITION OF SERVICE AREA

FIG. 3 illustrates an example of the partition of a typical emergency access system service area 300 using the capabilities of the present auxiliary monitoring system 112. The service area 300 typically comprises a plurality of communities, such as towns T1, T2, that can include facilities where there is restricted access to the facilities to prevent unauthorized individuals from gaining access to the facilities. Examples of such restricted access facilities are: gated residential communities, apartment buildings with locked entries, office buildings, school campus, military/government facilities, parks, and the like. These restricted access facilities typically have on-site staff that regulate access to the facilities and/or provide security services to those who occupy these facilities. Included in the emergency access system service area are a plurality of emergency service agencies that include: police (state, local, sheriff), fire, and ambulance.

The emergency access system 112 is programmed to divide the covered region 300 into a plurality of primary P and secondary S cells, with each primary cell P defining an emergency response agency and each secondary cell S defining an auxiliary agency, when appropriate. The primary P and secondary S cells can overlap in their coverage areas since the emergency response agencies may have dual jurisdiction for a particular region, such as police and ambulance and the primary response agencies serve areas managed by the auxiliary agencies. As shown in FIG. 3, the towns T1 and T2 have their own emergency response agencies and they are delimited as separate primary cells P1 and P2, respectively. The remaining area of the region 300 is then defined as a third primary cell P3 and is typically served by a single emergency response agency, such as a county sheriff and fire departments. Within the region 300 are a number of secondary cells that represent typical areas managed by auxiliary agencies. For example, secondary cell S1 comprises a gated community wherein a resident security force provides controlled access to its grounds to only the individuals resident therein. Therefore, the resident security force is an auxiliary agency and its communications facilities are denoted as the correspondence in the secondary cell S1 data structure. Similarly, secondary cell S2 comprises a park facility where resident park rangers patrol the grounds, but the local county sheriff has primary police jurisdiction. Therefore, the secondary cell S2 data structure denotes the park ranger facilities as the auxiliary agency operational in this cell.

The partitioning of the service area 300 into the above noted primary P and secondary S cells is accomplished by the manual input of data into the data structures illustrated in FIG. 1A by telephone company service personnel to thereby define the correspondence between the subscriber telephone station locations and the serving primary P and secondary S cells. The granularity of the cells are a function of the nature of the auxiliary agency. For example, a gated apartment complex community comprising a plurality of individual buildings, each with a security access lobby, can be a single secondary cell S1 if there is an operator available at the auxiliary agency (community security) that can facilitate the access of the emergency response personnel to the final destination, such as a single apartment in the complex. Alternatively, a separate secondary cell S11–S14 may be required for each building in the community as well as a secondary cell S1 for the community entry. In this case, there would be the need for a four-way communication connection, with the community personnel from the community entry and the community personnel from the individual building being involved in the emergency call as described above. In any case, the service address of each telephone station is programmed into the data structures and its correspondence to the appropriate emergency service agencies and auxiliary agencies are recorded therein, so that the auxiliary monitoring system 112 can, in response to a received emergency call, immediately and automatically retrieve the data from these data structures that define all of the agencies that are required to service this emergency call and place them in communication to facilitate the emergency response.

CELLULAR COMMUNICATION SYSTEM INTERFACE

In the instance where the calling subscriber is using a mobile subscriber station, the emergency access system 112 must identify the present location of the mobile subscriber station in order to connect the calling subscriber with an appropriate emergency service agency. In order to accomplish this task, the partitioning of the service area noted above includes a division of the service area into a plurality of cell sites/sectors (only CS1–CS3 being shown in FIG. 3 to simplify the Figure), each of which is associated with primary P and secondary S cells to enable the emergency access system to perform its automatic forwarding of the emergency call to the appropriate emergency service and auxiliary agencies. In particular, a set of data structures are maintained in the emergency access system that note the geographic extent of the service area for each emergency service agency and each auxiliary agency, which data can then be used with the geographic coordinates and/or cell site/sector data received from the cellular communications system, in a manner analogous to that described above with respect to the ANI data of the wired telephone system, to forward the received emergency call to the appropriate destination.

SUMMARY

Thus, the emergency access system is programmed to divide the covered region into a plurality of cells, with each cell defining a serving emergency response agency and serving auxiliary agency. Upon receipt of an incoming emergency call from a telephone station, the switching system determines the location from which the emergency access call originated, and the emergency access system identifies which cell(s) define the serving emergency agency and auxiliary agency for this location.

What is claimed:

1. In an emergency access telephone system, apparatus for alerting auxiliary emergency response agencies in response to an incoming emergency access call, comprising:

means for maintaining data indicative of a correspondence between a plurality of emergency response agencies and auxiliary emergency response agencies and service areas of each of said plurality of emergency response agencies and auxiliary emergency response agencies;

means, responsive to receipt of an incoming emergency access call from a subscriber telephone station located within the serving area of said emergency access telephone system, for identifying a locus associated with said subscriber telephone station;

means for identifying from said data and said identified locus, a one of both said plurality of emergency response agencies and auxiliary emergency response agencies that serve said identified locus; and means for alerting said one of both said plurality of emergency response agencies and auxiliary emergency response agencies.

2. The emergency access system of claim 1 wherein said subscriber telephone station comprises a mobile subscriber station, said means for identifying a locus comprises:

means for retrieving mobile subscriber station location data from a cellular communication system that serves said mobile subscriber station.

3. The emergency access system of claim 2 wherein said means for maintaining data comprises:

a data structure that identifies a correspondence between a geographic location and one of both said plurality of emergency response agencies and auxiliary emergency response agencies that serve said geographic location.

4. The emergency access system of claim 1 wherein said means for maintaining data comprises:

a plurality of data structures, each identifying a correspondence between a subscriber telephone station and one of both said plurality of emergency response agencies and auxiliary emergency response agencies that serve said identified locus.

5. The emergency access system of claim 1 wherein said means for alerting comprises:

means for routing said incoming emergency access call to said one of both said plurality of emergency response agencies and auxiliary emergency response agencies to enable bidirectional communications among operators located at said one of both said plurality of emergency response agencies and auxiliary emergency response agencies and a subscriber on said incoming emergency access call.

6. The emergency access system of claim 1 wherein said means for alerting comprises:

means for routing said incoming emergency access call to said one of both said plurality of emergency response agencies and auxiliary emergency response agencies to enable bidirectional communications between an operator located at said one of said plurality of emergency response agencies and a subscriber on said incoming emergency access call; and means for enabling controllable bidirectional communications between an operator located at said one of said plurality of emergency response agencies and an operator located at said one of said plurality of auxiliary emergency response agencies.

7. The emergency access system of claim 1 wherein said means for alerting comprises:

means for routing said incoming emergency access call to said one of said plurality of emergency response agencies to enable bidirectional communications between an operator located at said one of said plurality of emergency response agencies and a subscriber on said incoming emergency access call; and means for transmitting an alert signal to an operator located at said one of said plurality of auxiliary emergency response agencies.

8. The emergency access system of claim 7 wherein said means for transmitting comprises:

means for producing a text message that identifies receipt of said incoming emergency access call.

9. In an emergency access telephone system, a method for alerting auxiliary emergency response agencies in response to an incoming emergency access call, comprising the steps of:

maintaining data indicative of a correspondence between a plurality of emergency response agencies and auxiliary emergency response agencies and service areas of each of said plurality of emergency response agencies and auxiliary emergency response agencies;

identifying, in response to receipt of an incoming emergency access call from a subscriber telephone station located within the serving area of said emergency access telephone system, a locus associated with said subscriber telephone station;

identifying from said data and said identified locus, a one of both said plurality of emergency response agencies and auxiliary emergency response agencies that serve said identified locus; and alerting said one of both said plurality of emergency response agencies and auxiliary emergency response agencies.

10. The method of operating an emergency access system of claim 9 wherein said subscriber telephone station comprises a mobile subscriber station, said step of identifying a locus comprises:

retrieving mobile subscriber station location data from a cellular communication system that serves said mobile subscriber station.

11. The method of operating an emergency access system of claim 10 wherein said step of maintaining data comprises:

maintaining a data structure that identifies a correspondence between a geographic location and one of both said plurality of emergency response agencies and auxiliary emergency response agencies that serve said geographic location.

12. The method of operating an emergency access system of claim 9 wherein said step of maintaining data comprises:

maintaining a plurality of data structures, each identifying a correspondence between a subscriber telephone station and one of both said plurality of emergency response agencies and auxiliary emergency response agencies that serve said identified locus.

13. The method of operating an emergency access system of claim 9 wherein said step of alerting comprises:

routing said incoming emergency access call to said one of both said plurality of emergency response agencies and auxiliary emergency response agencies to enable bidirectional communications among operators located at said one of both said plurality of emergency response agencies and auxiliary emergency response agencies and a subscriber on said incoming emergency access call.

14. The method of operating an emergency access system of claim 9 wherein said step of alerting comprises:

routing said incoming emergency access call to said one of both said plurality of emergency response agencies and auxiliary emergency response agencies to enable bidirectional communications between an operator located at said one of said plurality of emergency response agencies and a subscriber on said incoming emergency access call; and enabling controllable bidirectional communications between an operator located at said one of said plurality of emergency response agencies and an operator located at said one of said plurality of auxiliary emergency response agencies.

15. The method of operating an emergency access system of claim 9 wherein said step of alerting comprises:

routing said incoming emergency access call to said one of said plurality of emergency response agencies to enable bidirectional communications between an operator located at said one of said plurality of emergency response agencies and a subscriber on said incoming emergency access call; and transmitting an alert signal to an operator located at said one of said plurality of auxiliary emergency response agencies.

16. The method of operating an emergency access system of claim 15 wherein said step of transmitting comprises:

producing a text message that identifies receipt of said incoming emergency access call.

17. In an emergency access telephone system, apparatus for alerting auxiliary emergency response agencies in response to an incoming emergency access call, comprising:

means for maintaining a plurality of data structures, each identifying a correspondence between a subscriber telephone station and one of both a plurality of emergency response agencies and auxiliary emergency response agencies that serve said subscriber telephone station;

means, responsive to receipt of an incoming emergency access call from a subscriber telephone station located within the serving area of said emergency access telephone system, for identifying a locus associated with said subscriber telephone station;

means for identifying from said data and said identified locus, a one of both said plurality of emergency response agencies and auxiliary emergency response agencies that serve said identified locus; and means for establishing a conference call connection to enable bidirectional communications among operators located at said one of both said plurality of emergency response agencies and auxiliary emergency response agencies and a subscriber on said incoming emergency access call.

18. The emergency access system of claim 17 wherein said subscriber telephone station comprises a mobile subscriber station, said means for identifying a locus comprises:

means for retrieving mobile subscriber station location data from a cellular communication system that serves said mobile subscriber station.

19. The emergency access system of claim 18 wherein said means for maintaining data comprises:

a data structure that identifies a correspondence between a geographic location and one of both said plurality of emergency response agencies and auxiliary emergency response agencies that serve said geographic location.

* * * * *